J. W. LAKIN.
BALL AND SOCKET JOINT.
APPLICATION FILED JUNE 19, 1919.

1,349,002.

Patented Aug. 10, 1920.

INVENTOR
John W. Lakin
BY Stuart C Barnes
HIS ATTORNEY.

UNITED STATES PATENT OFFICE.

JOHN W. LAKIN, OF DETROIT, MICHIGAN.

BALL-AND-SOCKET JOINT.

1,349,002.   Specification of Letters Patent.   Patented Aug. 10, 1920.

Application filed June 19, 1919. Serial No. 305,272.

*To all whom it may concern:*

Be it known that I, JOHN W. LAKIN, a citizen of the United States, residing at Detroit, in the county of Wayne and State of Michigan, have invented certain new and useful Improvements in Ball-and-Socket Joints, of which the following is a specification.

This invention relates to ball and socket joints, and has for its object a ball and socket joint that may be fixed in any one of a number of positions within its range of movement. The joint is also adjustable to vary the degree of binding.

The joint is primarily intended to act as an adjustable support for a camera, but obviously can be used for other purposes.

In the drawings,—

There are two cups $a$ and $b$, each provided with a part-spherical complementary surface, which form the two essential members of the ball and socket joint. The cup $a$ is provided with the cover $c$ which is provided with an outside flange which fits tightly in the cup $a$, while the cup $b$ is provided with a cover $d$. The cup $a$ will be designated the male cup and the cup $b$ the female cup. The male cup cover $c$ is provided with a screw stud $e$ for attachment to the camera or other object, while the female cup cover $d$ is provided with a central interiorly-threaded nipple portion $f$ adapted to receive a similar stud that may be on the tripod or any other object.

The male cup $a$ is provided with a large central aperture $g$, the diameter of which, in connection with the diameter of the rivet $h$ that passes therethrough, determines the range of movement that is permissible between the two cup members. This rivet $h$ is fast to a yoke $i$ which is provided with two turned-in cam-engaging lips $j$ that are adapted to engage the two spiral cam wings $k$ on the cam $l$. This cam $l$ is provided with a hub on which the spiral cam wings are carried and which is internally threaded to engage the external threads on the nipple $f$ of the female cup cover $d$. This cam is provided with an arm having a turned-up end $m$ adapted to ride along the interior of the side wall of the female cup $b$. The pin $n$ may be fitted into the aperture in this turned-up end and protrude through the segmental slot $o$ in the side wall of the female cup $b$.

Figure 1:
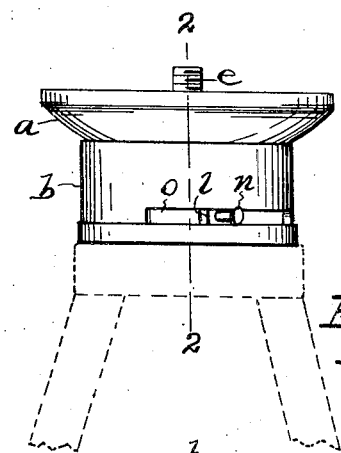
Figure 1 is a side elevation.
Figure 2:
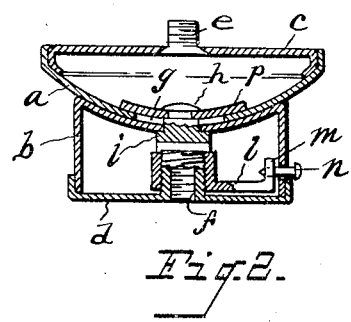
Fig. 2 is a cross section on the line 2—2 of Fig. 1.
Figure 3:
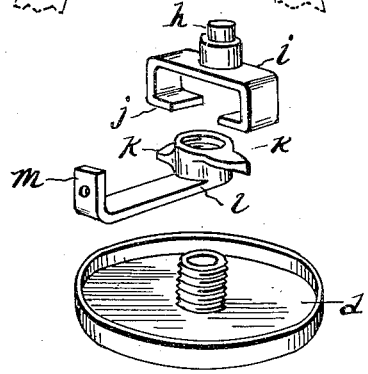
Fig. 3 is a detail view showing how the cam and the yoke are assembled on to the adjustable cover.
Figure 4:
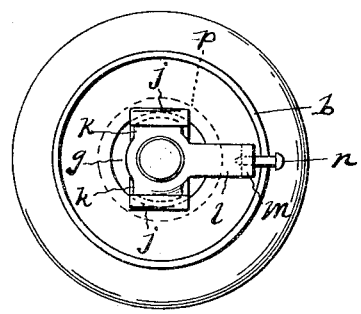
Fig. 4 is an interior view of the parts shown in Fig. 2 with the cover $d$ removed.

The assembly is effected by riveting the concaved washer $p$ on the inside of the male cup member and the yoke $i$ together before the male cup cover $c$ is fitted into place. This ties the two cup members $a$ and $b$ loosely together. The cam is then inserted with the wings under the lips $j$ of the yoke and the female cup cover $d$ then screwed into the cam. Of course, the farther in it is screwed the tighter it will draw the washer $p$ against the inside of the male cup $a$ and the female cup cover $d$ against the edge of the barrel portion of the female cup $b$. Of course, this could be screwed up so tight that this arrangement in itself practically fixes the position of one cup member with respect to the other. However, the primary purpose of this arrangement aside from the assembly is to establish the relative looseness or play between the two cup members and then an additional quick adjustment member is afforded by the cam. For instance, the cover $d$ is screwed up until the two cups are brought together so that they have very little looseness but still are capable of relative movement. Then obviously by moving the pin $n$ to swing the cam arm, the cam $l$ causes the wings $k$ that are spiral to bear upon the lips $j$ of the yoke and draw the two cups tightly together. This movement is from right to left as shown in Fig. 1, or what is in effect a left hand screw.

This double adjustment has a further feature for the adjustment by means of the drawing effect of the cover $d$ may be such that a certain amount of friction is effected between the two cup members, not sufficient to prevent movement when a firm effort is made but sufficient to prevent an accidental displacement of the position that has been temporarily established, while the pin may then be moved across the slot $o$ to cause the cam to substantially lock the members in this adjustment. This is very advantageous in adjusting the camera, for after the movement of the camera has been effected to the desired position there is not the likelihood of displacement while the adjustment is being fixed.

The base of the joint (cup cover $d$) can be made with the necessary attachment to engage the tripod, if desired.

What I claim is:

1. A ball and socket joint, having in combination, a pair of complementary and apertured cups, a washer within one of the cups, a rivet fastened to the washer and passing through the apertures in the cups, a yoke on the end of the rivet provided with a pair of lips, and a cam supported in the cup other than the one which bears the washer for engaging or disengaging the lips of the yoke and by the former drawing the washer toward such cup to bind the two cups together.

2. A ball and socket joint, having in combination, a pair of complementary cup members, a washer engaged in one of the cups, a yoke engaging in the other cup, a rivet for connecting the washer and the yoke, a cam provided with a hub having interior threads, and cam wings, the latter adapted to engage the yoke to pull the washer against the inside of the cup that contains it, and a cover for the other cup provided with a nipple having threads to engage the threads of the hub of the cam to effect a preliminary adjustment of the washer.

3. A ball and socket joint, having in combination, a male cup and a female cup fitted together, a washer within one of the cups, a cam engager fitted in the other cup and rigidly secured to the washer, a quick action cam supported in one of the cups and adapted when rotated to engage the cam engager to thereby draw the washer against the inside of the cup that contains it to bind the two cups together, and independent means for drawing on the cam, causing the cam to draw on the cam engager and the washer, thereby varying the initial binding action between the two cups.

4. A ball and socket joint, having in combination, a pair of cups seated one within the other, a washer contained within one cup, a cam engager contained in the other cup, a connection between the washer and the cam engager, a cam rotatably supported in the other cup adapted to engage the cam engager to draw the washer against the inside surface of the cup that contains it to bind the two cups together, and a cover provided with a nipple to rotatably support the cam.

5. A ball and socket joint, having in combination, a pair of complementary cups, a washer contained in one of the cups, a cam engager contained in the other cup, a connection between the washer and cam engager, a cover for the cup other than the one which contains the washer provided with a threaded nipple, and a cam having an internally threaded hub adapted to be supported upon the threads of the said nipple, said cam adapted to engage the cam engager to draw the washer against the inside of the cup that contains it to bind the two cups together and the said cover adapted to be rotated upon the cup which it engages to also draw the washer into engagement with the cup that contains it to bind the two cups together.

In testimony whereof I affix my signature.

JOHN W. LAKIN.